(12) United States Patent
Chihara et al.

(10) Patent No.: US 11,113,543 B2
(45) Date of Patent: Sep. 7, 2021

(54) FACILITY INSPECTION SYSTEM AND FACILITY INSPECTION METHOD

(71) Applicant: HITACHI HIGH-TECH FINE SYSTEMS CORPORATION, Saitama (JP)

(72) Inventors: Nobuhiro Chihara, Tokyo (JP); Masahiko Honda, Tokyo (JP); Toshihide Kishi, Tokyo (JP); Masashi Shinbo, Tokyo (JP); Kiyotake Horie, Kodama-gun (JP)

(73) Assignee: HITACHI HIGH-TECH FINE SYSTEMS CORPORATION, Saitama (JP)

( * ) Notice: Subject to any disclaimer, the term of this patent is extended or adjusted under 35 U.S.C. 154(b) by 85 days.

(21) Appl. No.: 16/465,373

(22) PCT Filed: Dec. 1, 2017

(86) PCT No.: PCT/JP2017/043234
§ 371 (c)(1),
(2) Date: May 30, 2019

(87) PCT Pub. No.: WO2018/101455
PCT Pub. Date: Jun. 7, 2018

(65) Prior Publication Data
US 2019/0392225 A1 Dec. 26, 2019

(30) Foreign Application Priority Data
Dec. 2, 2016 (JP) ................ JP2016-235278

(51) Int. Cl.
*G06K 9/00* (2006.01)
*B60M 1/28* (2006.01)
(Continued)

(52) U.S. Cl.
CPC ........... *G06K 9/00791* (2013.01); *B60M 1/28* (2013.01); *B61L 15/0081* (2013.01); *B61L 23/00* (2013.01); *G01B 11/002* (2013.01); *G06K 9/0063* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0291994 A1* | 12/2007 | Kelle | ............... | G01S 7/4802 |
| | | | | 382/110 |
| 2012/0274772 A1* | 11/2012 | Fosburgh | ............. | B61K 9/08 |
| | | | | 348/149 |

(Continued)

FOREIGN PATENT DOCUMENTS

| | | |
|---|---|---|
| GB | 2542115 A | 3/2017 |
| JP | 06-325298 A | 11/1994 |

(Continued)

OTHER PUBLICATIONS

Great Britain Office Action dated Jul. 6, 2021 for GB Patent Application No. 1907725.4.

*Primary Examiner* — Tsung Yin Tsai
(74) *Attorney, Agent, or Firm* — Volpe Koenig

(57) ABSTRACT

A facility inspection system prevents a normal part from being detected as an abnormal part caused by a deviation in an alignment due to a presence/absence of a moving object in detecting the abnormal part in a surrounding environment of a vehicle moving on a track. The system includes a photographing device, storage device, separation unit, an alignment unit, and a extraction unit. The photographing device photographs the surrounding environment of the moving vehicle. The storage device stores a reference alignment point cloud and a reference difference-extraction point cloud for each position on the track. The separation unit (Continued)

separates the alignment point cloud from a three-dimensional point cloud. The alignment unit aligns the reference alignment point cloud and the alignment point cloud and outputs alignment information. The extraction unit extracts a difference between the three-dimensional point cloud deformed based on the alignment information and the reference difference-extraction point cloud.

10 Claims, 10 Drawing Sheets

(51) Int. Cl.
  *B61L 15/00* (2006.01)
  *B61L 23/00* (2006.01)
  *G01B 11/00* (2006.01)

(56) References Cited

U.S. PATENT DOCUMENTS

| | | | |
|---|---|---|---|
| 2013/0230212 A1* | 9/2013 | Landes | G06K 9/00791 |
| | | | 382/104 |
| 2016/0221592 A1* | 8/2016 | Puttagunta | B61L 25/04 |
| 2017/0066459 A1* | 3/2017 | Singh | B61L 23/045 |
| 2019/0004534 A1* | 1/2019 | Huang | G05D 1/0088 |
| 2019/0039633 A1* | 2/2019 | Li | G06K 9/00791 |

FOREIGN PATENT DOCUMENTS

| | | |
|---|---|---|
| JP | 2004-352107 A | 12/2004 |
| JP | 2007-129560 A | 5/2007 |
| JP | 2010-006295 A | 1/2010 |
| JP | 2010-202017 A | 9/2010 |
| JP | 2016-110210 A | 6/2016 |

\* cited by examiner

TWO-DIMENSIONAL IMAGE WHERE
ABNORMAL PART IS INDICATED

BUSINESS DOCUMENT FORMAT

| REFERENCE POSITION INFORMATION | ALIGNMENT AREA CANDIDATE INFORMATION |
|---|---|
| (35.681382,139.766084),124.45 | (113.2,135.1,17.3),··· |
| (35.681342,139.766031),125.30 | (−133.6,−1.1,55.2),··· |
| (35.681321,139.766011),125.52 | (10.2,52.1,87.6),··· |
| (35.681313,139.765995),125.78 | (75.2,135.8,84.7),··· |
| (35.681293,139.765979),125.98 | (66.3,48.5,78.1),··· |
| ⋮ | ⋮ |

FACILITY INSPECTION SYSTEM AND FACILITY INSPECTION METHOD

TECHNICAL FIELD

This disclosure relates to a facility inspection system and a facility inspection method.

BACKGROUND ART

There are various railroad facilities such as a substation, a beam, and an overhead line around a railroad rail. When foreign objects adhere to these facilities or damages are caused on the facilities, a railroad operation is interfered. FIG. 16 illustrates examples of the adherence of the foreign objects to the railroad facility and the damage of the railroad facility. When a flying object 15A such as a polyethylene bag and clothes adheres to the overhead line, a damage is caused on a railroad vehicle passed by. When a damage 15B occurs on a hanger that hangs the overhead line, the overhead line droops down to cause a damage on the railroad vehicle passed by and a failure of other railroad electrical equipment due to a ground fault. When a part of a member that supports the beam and the overhead line drops off, a deformation, a collapse, or the like of this facility possibly brings danger to a passenger and the public. For these failures, currently, maintenance inspectors actually inspect states around the railroad rail by visual checks to detect presence/absence of the foreign object and the damage.

CITATION LIST

Patent Literature

Patent Literature 1: Japanese Unexamined Patent Application Publication No. 2010-202017

SUMMARY OF INVENTION

Technical Problem

When the maintenance inspectors perform the visual checks of the facilities around the railroad rails, the maintenance inspectors actually move along the rails and confirm the absence of the adherence of foreign objects and the damage on the railroad facilities. However, this inspection method causes the following problems as long as the maintenance inspector is involved. For example, (i) the inspection cannot be frequently performed, thus unavoidably having an interval between the inspections, (ii) mobilizing the maintenance inspectors causes a considerable cost at every inspection, and (iii) the difference in ability and experience between the maintenance inspectors causes the difference in the inspection result. Therefore, automated inspection methods of the railroad facility have been examined.

Patent Literature 1 discloses an obstacle detection system. In the system of Patent Literature 1, a three-dimensional sensor is installed to a vehicle, a three-dimensional point cloud in a surrounding environment is obtained while moving on the rail, and an obstacle entered in an operating vehicle area indicating an area of the vehicle is detected from the obtained three-dimensional point cloud. However, the system of Patent Literature 1 has a problem that while the foreign object (for example, a plant) entered in the operating vehicle area can be detected, the foreign object and the damage on the facility (hereinafter simply referred to as an "abnormal part") outside the operating vehicle area, for example, a flying object adhered to the overhead line, a damage of the hanger, and a damage of a substation facility, cannot be detected.

As a method for detecting the abnormal part outside the operating vehicle area, there is a technique to identify the abnormal part by comparing a current three-dimensional point cloud with a past normal three-dimensional point cloud. In this technique, the barycentric position of the past normal three-dimensional point cloud and the barycentric position of the current three-dimensional point cloud are calculated and an alignment is performed so as to eliminate the difference between these barycentric positions. Then, the current three-dimensional point cloud is compared with a normal three-dimensional point cloud after the alignment, and a point cloud indicating a difference is detected as the abnormal part.

However, in the above-described method, when the three-dimensional point cloud includes a moving object, the alignment between the past normal three-dimensional point cloud and the current three-dimensional point cloud cannot be performed well. FIG. 17 illustrates a concrete example of the moving object around the rail. As illustrated in FIG. 17, examples of the moving object include a plant 16A grown near the railroad facility and swayed in a wind, an automobile 16B traveling on a road adjacent to the railroad facility, and similar object. When the current three-dimensional point cloud includes a three-dimensional point cloud of the moving object as illustrated in FIG. 17, the barycentric position of the current three-dimensional point cloud deviates compared with a three-dimensional point cloud without the moving object. In this case, a problem arises in that a deviation occurs in the alignment between the barycentric position of the past normal three-dimensional point cloud and the barycentric position of the current three-dimensional point cloud, resulting in detecting, as the abnormal part, a normal part originally being normal.

Therefore, this disclosure provides a technique to prevent a normal part from being detected as an abnormal part caused by a deviation in an alignment due to a presence/absence of a moving object in detecting the abnormal part in a surrounding environment of a vehicle moving on a track (for example, a rail).

Solution to Problem

For example, to solve the above-described problems, a configuration described in claims is employed. This application includes a plurality of means to solve the above-described problems, and as one example, a facility inspection system is provided. The facility inspection system includes a photographing device, a storage device, an alignment area separation unit, an alignment unit, and a difference extraction unit. The photographing device photographs an image of a surrounding environment of a vehicle moving on a track. The storage device stores a reference alignment point cloud and a reference difference-extraction point cloud for each position on the track. The alignment area separation unit separates an alignment point cloud from a three-dimensional point cloud obtained from the image. The alignment unit performs an alignment of the reference alignment point cloud and the alignment point cloud. The alignment unit outputs alignment information. The difference extraction unit extracts a difference between the three-dimensional point cloud deformed based on the alignment information and the reference difference-extraction point cloud.

With another example, a facility inspection method is provided. The facility inspection method includes a step of photographing an image of a surrounding environment of a vehicle moving on a track by a photographing device, a step of separating an alignment point cloud from a three-dimensional point cloud obtained from the image by an alignment area separation unit, a step of performing an alignment of a reference alignment point cloud stored in a storage device and the alignment point cloud and outputting alignment information by an alignment unit, and a step of extracting a difference between the three-dimensional point cloud deformed based on the alignment information and a reference difference-extraction point cloud stored in the storage device by a difference extraction unit.

Advantageous Effects of Invention

This disclosure can prevent the normal part from being detected as the abnormal part caused by the deviation in the alignment due to the presence/absence of the moving object in detecting the abnormal part in the surrounding environment of the vehicle moving on the track (for example, the rail). Further features pertain to this disclosure will become clear by descriptions in this Description and attached drawings. Problems, configurations, and effects other than ones described above will be made apparent from the following description of embodiments.

DESCRIPTION OF EMBODIMENTS

The following describes embodiments of this disclosure with reference to the attached drawings. While the attached drawings illustrate specific embodiments based on principles of this disclosure, the drawings are provided merely for understanding this disclosure, and are by no means used for understanding this disclosure in a limited way.

The following embodiments relate to a technique to automatically detect an abnormal part (for example, a foreign object and a damage of facility) in a surrounding environment of a vehicle moving on a track. Here, the track includes, for example, a rail and a guide rail. The vehicle includes various vehicles traveling on the track, for example, a business vehicle, a test vehicle, and a maintenance vehicle.

First Embodiment

Figure 1:
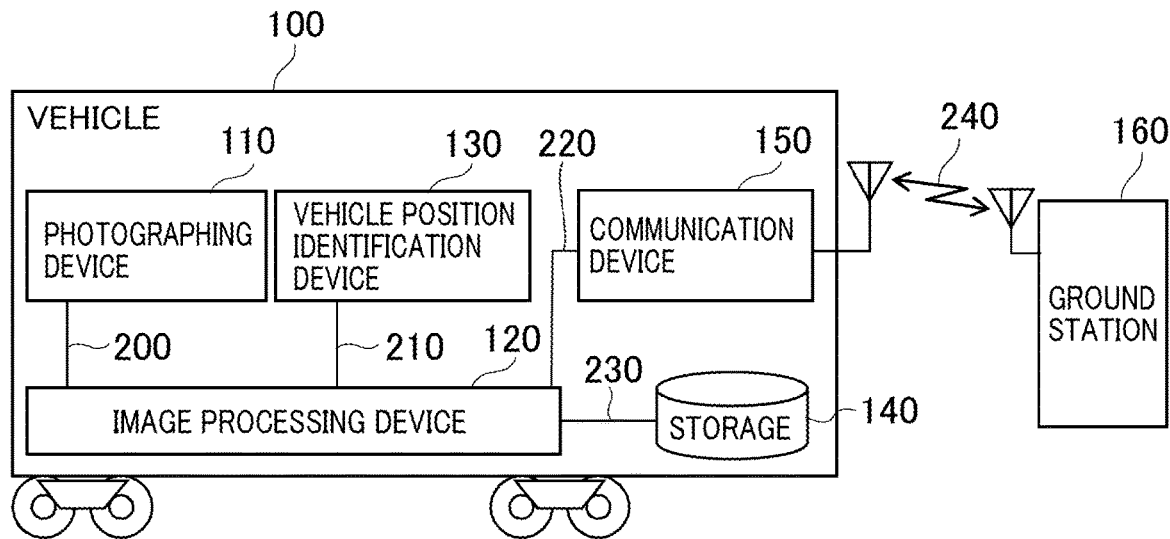
FIG. 1 is a drawing describing a configuration of a railroad facility inspection system according to a first embodiment.

FIG. 1 is a drawing describing a configuration of a railroad facility inspection system according to the first embodiment. The railroad facility inspection system includes a vehicle 100 and a ground station 160.

The vehicle 100 includes a photographing device 110, an image processing device 120, a vehicle position identification device 130, a storage (storage device) 140, and a communication device 150. As described above, the vehicle 100 may be the test vehicle, a road railer, and similar vehicle in addition to the business vehicle insofar as the vehicle 100 can move along a railroad rail.

The photographing device 110 obtains a range image 200 of the surrounding environment of the vehicle 100, and outputs the range image 200 to the image processing device 120. The photographing device 110 only needs to include a device configured to obtain the range image, for example, a stereo camera and a three-dimensional sensor of a Time-of-Flight (TOF) method. For example, the photographing device 110 has a detection distance of 0 to several tens of meters, for example, 0 to 30 m.

The following description uses an example where the photographing device 110 photographs an image of a forward range in a traveling direction of the vehicle 100. A photograph target of the photographing device 110 is not limited to the forward range of the vehicle 100, but any range (for example, a rear range in the traveling direction and a range in a lateral direction perpendicular to the traveling direction) in all directions of the vehicle 100 can be set to the photographed target by appropriately changing an installation position of the photographing device 110.

The image processing device 120 receives the range image 200 as input information from the photographing device 110, receives vehicle position information 210 as input information from the vehicle position identification device 130, and obtains reference three-dimensional point cloud information 230 from the storage 140. The image processing device 120 executes a changed area detection process based on these pieces of input information, and outputs changed area information 220 to the communication device 150. Here, the changed area is an area detected by comparing a current three-dimensional point cloud with a past normal three-dimensional point cloud, and this changed area can be considered as an abnormal part (foreign object and damaged part).

The vehicle position identification device 130 uses, for example, a Global Positioning System (GPS) device and an Inertial Measurement Unit (IMU) to identify a current position and the like of the vehicle 100, and outputs them as the vehicle position information 210 to the image processing device 120. The storage 140 holds information read by the image processing device 120 as a database. In this embodiment, the current position of the vehicle is identified with a latitude, a longitude, and an orientation, while the vehicle position information is not limited to this. As the vehicle position information, a distance (kilometrage) from a starting point of the rail and information on a line (for example, up, down, main line, and subsidiary main line) may be used.

The communication device 150 receives the changed area information 220 as the input information, and transmits it to the ground station 160 as a changed area detection signal 240. For communications between the communication device 150 and the ground station 160, a general line such as a mobile phone network may be used, or another network may be used. The ground station 160 may include a processing device (not illustrated) configured to receive the changed area detection signal 240 transmitted from the communication device 150 of the vehicle 100 and present the abnormal part to a maintenance inspector via a display device (for example, a display). The ground station 160 may include a document generation device (not illustrated), and may automatically generate a business document such as a facility inspection report and a repair work instruction by laying out information of the abnormal part, date/time and a place where the abnormal part is found, and similar matter on the document via this document generation device.

Figure 2:
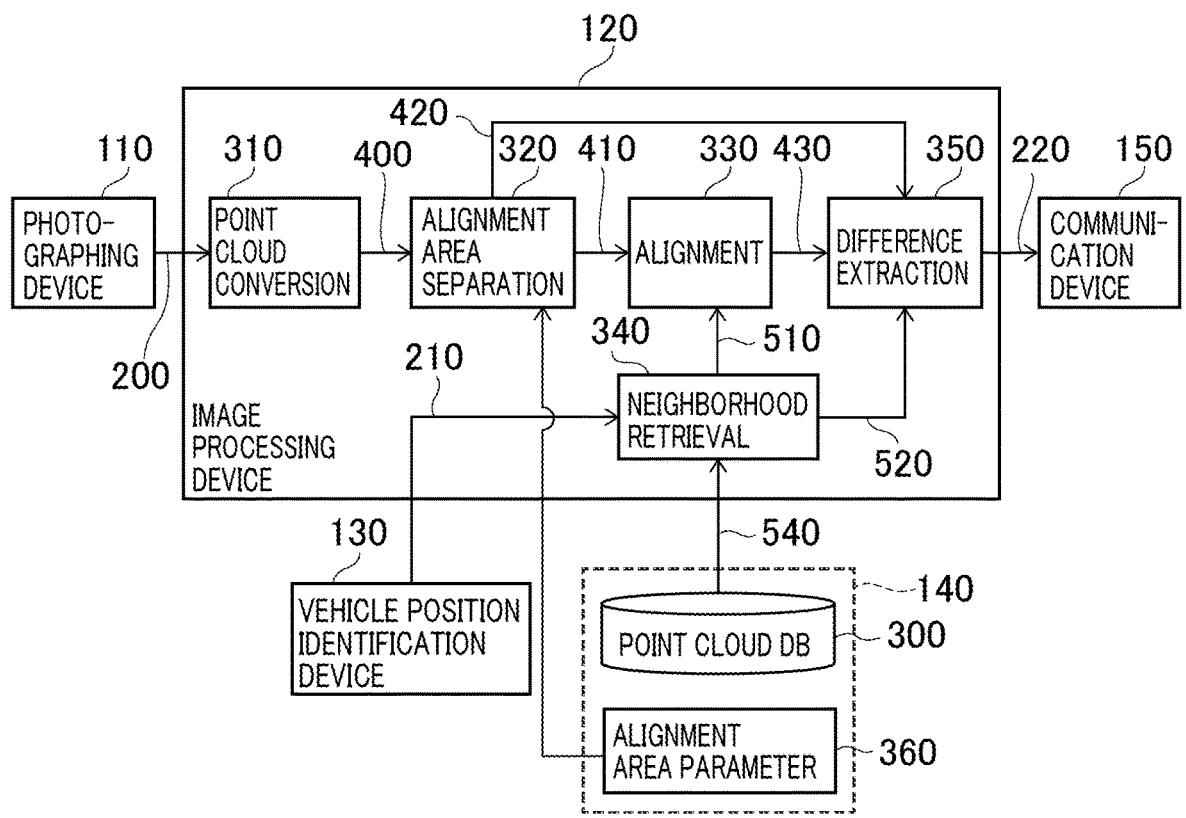
FIG. 2 is a drawing describing a configuration of an image processing device according to the first embodiment.

FIG. 2 is a drawing illustrating a configuration of the image processing device according to the first embodiment. The image processing device 120 includes a point cloud conversion unit 310, an alignment area separation unit 320, an alignment unit 330, a neighborhood retrieval unit 340, and a difference extraction unit 350.

The image processing device 120 may be achieved, for example, using a general use computer. The image processing device 120 may include processing units each achieved as a function of a program executed on the computer. The computer at least includes a processor such as a Central Processing Unit (CPU) and a storage unit such as a memory. The process by the image processing device 120 may be achieved such that program codes corresponding to respective processing units are stored in the memory and the processor executes each of the program codes.

Figure 3:
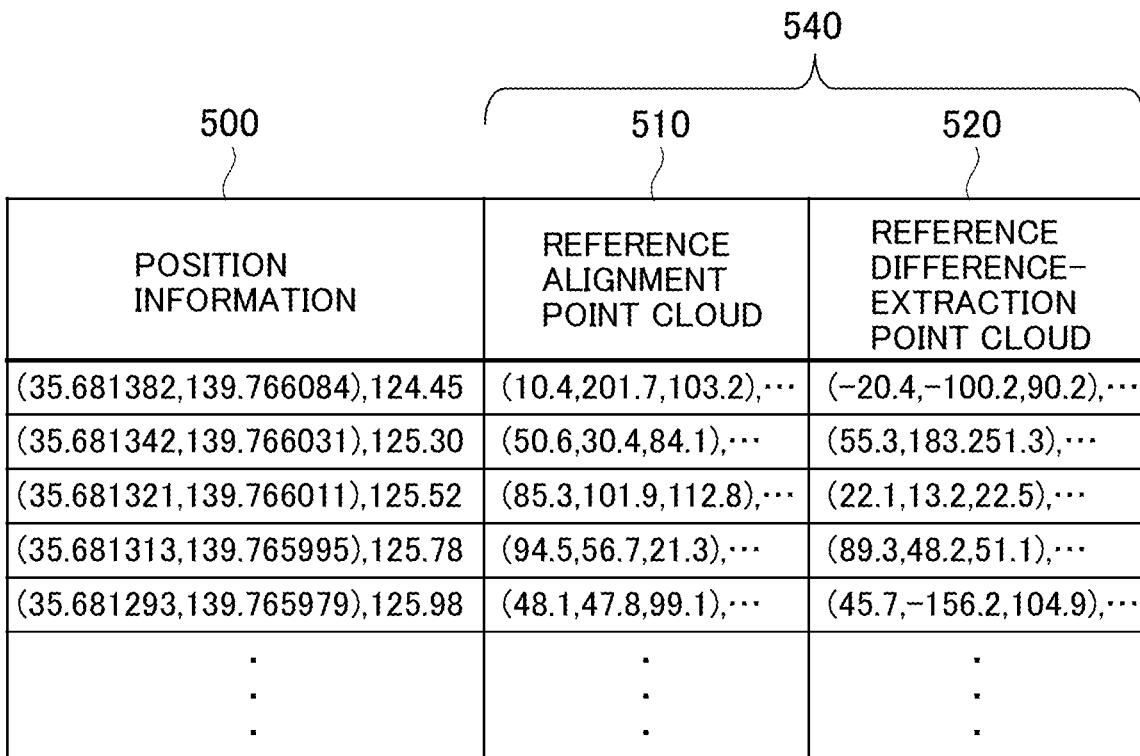
FIG. 3 is a drawing describing a point cloud DB.

A point cloud Database (DB) 300 is a database implemented to the storage 140. FIG. 3 illustrates an exemplary point cloud DB 300. The point cloud DB 300 includes position information 500 and reference three-dimensional point cloud information 540 as configuration items. The point cloud DB 300 includes past point cloud information where normal states have been confirmed at respective positions (position information 500) on the rail. In other words, the point cloud DB 300 is a DB that stores reference information relating the surrounding environment of the vehicle 100 where the normal state has been confirmed.

The reference three-dimensional point cloud information 540 includes a reference alignment point cloud 510 and a reference difference-extraction point cloud 520. The reference alignment point cloud 510 is a point cloud used in an alignment process in the alignment unit 330. The reference alignment point cloud 510 may be a point cloud obtained from images of respective positions on the rail by the photographing device 110 at a travel on the rail in the past. For example, the reference alignment point cloud 510 includes point clouds obtained at respective positions on the rail in an area 550 of FIG. 5 when the vehicle 100 traveled on the rail in the past. The reference difference-extraction point cloud 520 is a point cloud as a reference for detecting the changed area. For example, the reference difference-extraction point cloud 520 includes point clouds obtained from the images of the respective positions on the rail by the photographing device 110 when the vehicle 100 traveled on the rail in the past. Thus, the point cloud DB 300 holds the reference alignment point cloud 510 and the reference difference-extraction point cloud 520 in association with the position information 500 of the photographed position.

The position information 500 holds the respective positions on the rail as the information of the latitude, the longitude, and the orientation. The reference alignment point cloud 510 and the reference difference-extraction point cloud 520 each have a set of XYZ coordinates. As described above, as the position information 500, the distance (kilometrage) from the starting point of the rail and the information on the line (for example, up, down, main line, and subsidiary main line) may be used.

While the example where the vehicle 100 is actually traveled on the rail to generate the point cloud DB 300 is described above, the configuration is not limited to this. The point cloud DB 300 may be generated from design information on the rail and the surrounding environment (for example, CAD data). With this configuration, the changed area can be detected from the design information as the reference. When the point cloud DB 300 is generated from the design information as the reference, the point cloud DB 300 is applicable to a use for confirming the surrounding environment to be constructed as designed by causing the vehicle 100 to travel after the construction of the rail and its surrounding environment. This is because the changed area information 220 detected by the image processing device 120 indicates the difference with the design information, thus ensuring the detection of a part not constructed as designed.

Figure 4:
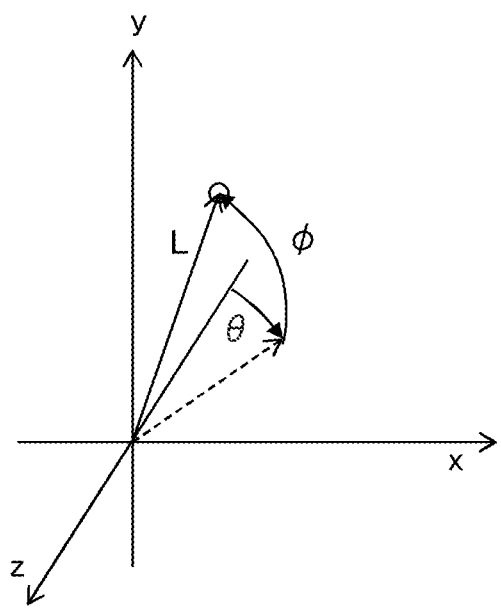
FIG. 4 is a drawing describing a method for calculating coordinates to convert from a range image to a three-dimensional point cloud.

The point cloud conversion unit 310 converts the range image 200 input from the photographing device 110 into a three-dimensional point cloud 400 and outputs the three-dimensional point cloud 400 to the alignment area separation unit 320. FIG. 4 is a drawing describing a method for calculating coordinates to convert from the range image 200 to the three-dimensional point cloud 400. The range image 200 has pixels each obtained from a distance L to an object, and an angle φ on a ZY-plane and an angle θ on a XZ-plane from a center of an image. The point cloud conversion unit 310 performs a conversion process from the range image 200 into coordinates of respective points of the three-dimensional point cloud 400 based on Math. 1.

$x = L \cos \varphi \sin \theta$ $y = L \sin \varphi$ $z = -L \cos \varphi \cos \theta$ [Math. 1]

The alignment area separation unit 320 receives the three-dimensional point cloud 400 as the input information from the point cloud conversion unit 310. The alignment area separation unit 320 outputs the point cloud included in the alignment area in the three-dimensional point cloud 400 as an alignment point cloud 410 to the alignment unit 330, and outputs every point cloud in the three-dimensional point cloud 400 as a difference-extraction point cloud 420 to the difference extraction unit 350. A parameter 360 defining the alignment area may be held in the storage 140 for example, and the alignment area separation unit 320 can obtain the parameter 360 defining the alignment area from the storage 140.

Figure 5:
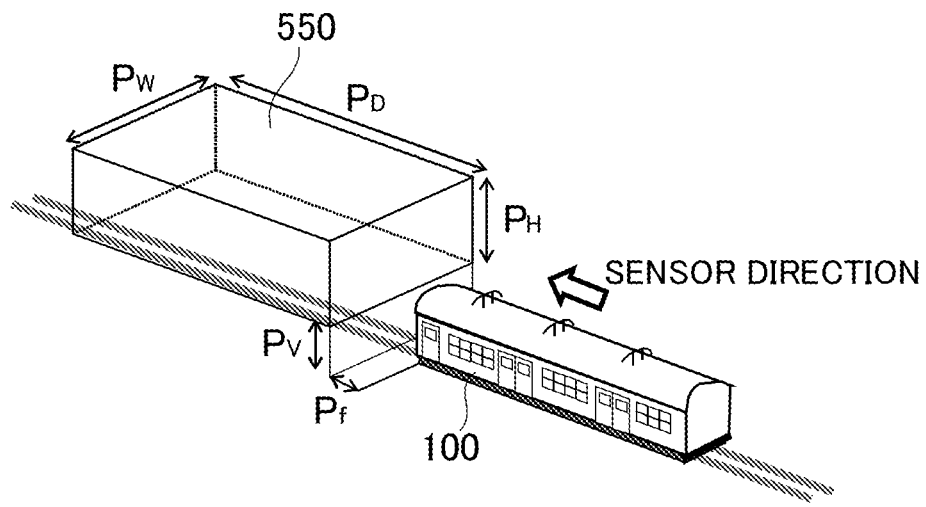
FIG. 5 is a drawing illustrating an exemplary alignment area.

FIG. 5 illustrates an example of extracting the point cloud included in the alignment area as the alignment point cloud.

An alignment area 550 is configured by a plurality of parameters, and for example, a space forward and upward of the vehicle 100. The space forward and upward of the vehicle 100 (the space obliquely upward with respect to the vehicle 100) is an area mainly including, for example, an overhead line and a construction supporting the overhead line, and an area seemed to include few moving objects. For example, the alignment area 550 is set at a position forward of the vehicle 100 by Pf and a position having a height Pv from the rail position as a reference. The alignment area 550 is represented as a three-dimensional space having a height $P_H$, a depth $P_D$, and a width $P_W$.

For example, the alignment area 550 is preferably configured to a space likely to include few moving objects such as a person moving in a station building, another train traveling on an adjacent rail, and a vehicle traveling on an adjacent road. For example, when the photographing device 110 is installed on a driving position, the alignment area 550 is preferably configured in a range of Pf=3 to 6 m, Pv=4 to 8 m, $P_H$=2 to 6 m, $P_W$=3 to 20 m, and $P_D$=10 to 70 m.

For example, the configuration of Pf=3 m, Pv=4 m, $P_H$=3 m, $P_W$=10 m, and $P_D$=70 m ensures specification of the alignment area 550 as the area including few moving objects. These parameters may be configured to be adjustable from outside according to a railroad standard and an operation environment such as a vehicle height and a height of a sensor installed to the vehicle.

Figure 6:
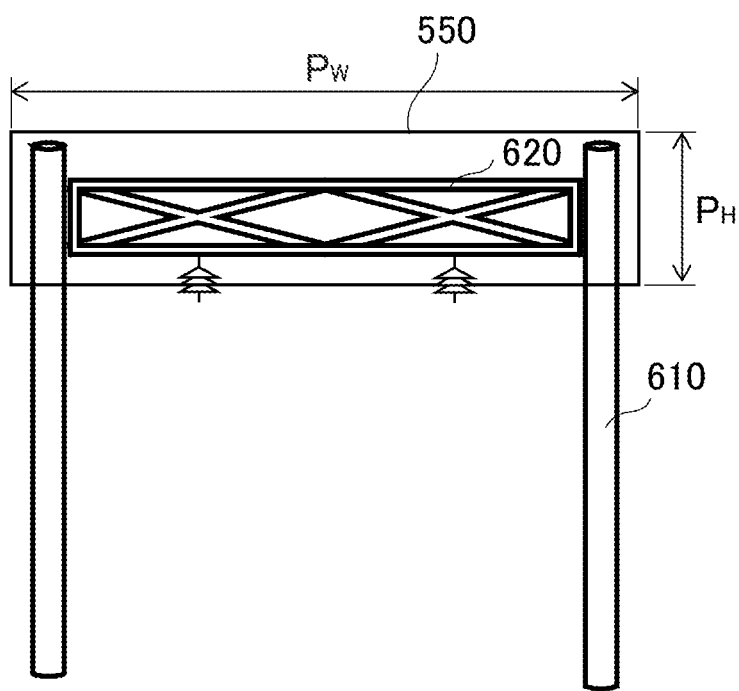
FIG. 6 is a drawing illustrating an exemplary alignment area.

FIG. 6 illustrates an exemplary alignment area 550. The alignment area 550 is preferably configured so as not to include the moving object and include an object with little change in state due to the environment and the like. As one example, the alignment area 550 is configured so as to include at least a part of a utility pole 610 disposed along the rail and at least a part of a beam 620 disposed between the utility poles 610. Specifically, as illustrated in FIG. 6, the parameters (for example, $P_W$ and $P_H$) defining the alignment area 550 may be configured so as to include upper end portions of the utility poles 610 and the beam 620.

Figure 7:
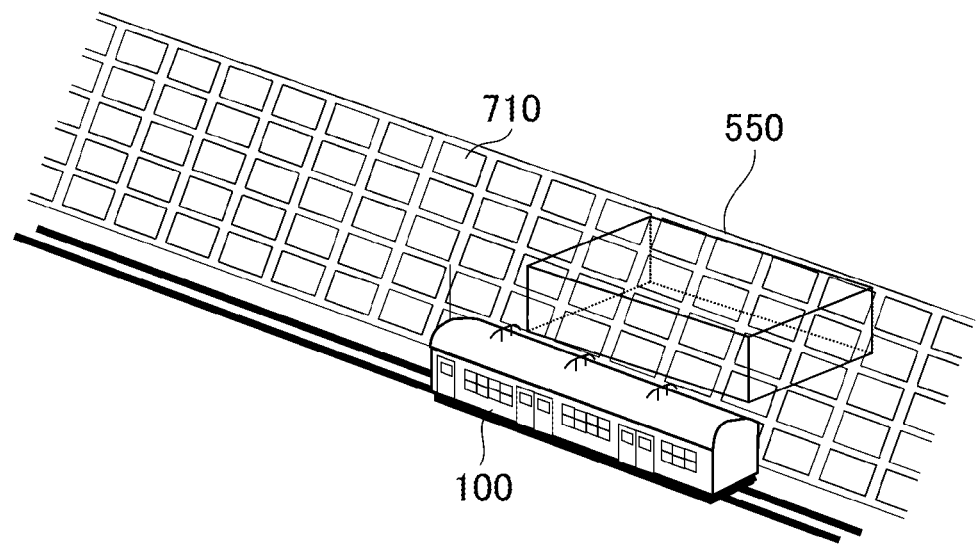
FIG. 7 is a drawing illustrating an exemplary alignment area.

FIG. 7 illustrates another example of the alignment area 550. From a perspective of not including the moving object and including the object with little change in state due to the environment and the like, the alignment area 550 may be configured so as to include a slope 710 on a side surface side of the vehicle 100. The slope is an inclined surface part disposed by cutting or piling up the ground when the rail is laid.

The above-described alignment areas 550 are merely examples, and the configuration is not limited to them. The photographing device 110 may be disposed on a roof of the vehicle, and a space upward with respect to the vehicle may be used as the alignment area 550. As another example, the alignment area 550 may be configured so as to include a construction such as a building adjacent to the railroad rail, a roof of a platform of a station, and similar object.

Figure 8:
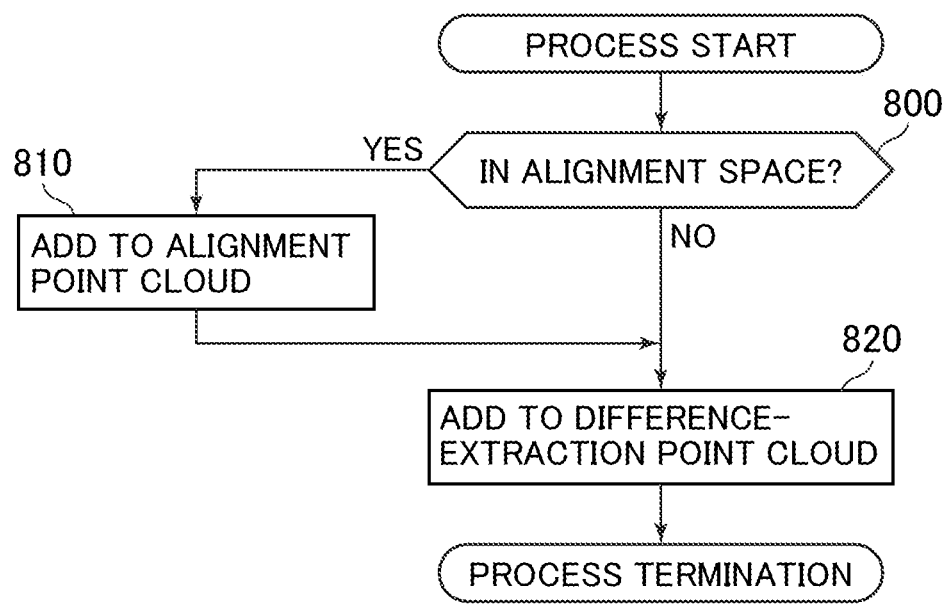
FIG. 8 illustrates an exemplary flowchart describing a process by an alignment area separation unit according to the first embodiment.

FIG. 8 illustrates an exemplary flowchart describing a process by the alignment area separation unit 320. The alignment area separation unit 320 performs an alignment area determination first with the points of the three-dimensional point cloud 400 input from the point cloud conversion unit 310 as a target point cloud (Step 800). The alignment area separation unit 320 determines whether the coordinate of the target point cloud is present within the alignment area 550 or not.

When the target point is determined to be present within the alignment area 550 at Step 800, the alignment area separation unit 320 adds this point to the alignment point cloud 410 (Step 810), and then, the process proceeds to Step 820.

Meanwhile, when the target point is determined not to be present within the alignment area 550 at Step 800, the process proceeds to Step 820.

The alignment area separation unit 320 adds the target point to the difference-extraction point cloud 420 (Step 820). After the flowchart of FIG. 8 terminates on every point of the three-dimensional point cloud 400, the alignment area separation unit 320 outputs the alignment point cloud 410 to the alignment unit 330, and outputs the difference-extraction point cloud 420 to the difference extraction unit 350.

The neighborhood retrieval unit 340 receives the vehicle position information 210 as the input information from the vehicle position identification device 130. The neighborhood retrieval unit 340 uses the vehicle position information 210 to retrieve information from the point cloud DB 300, and reads the reference three-dimensional point cloud information 540 associated with the position information 500 nearest to the vehicle position information 210. For example, in the case of the vehicle position information 210 (Nlat, Nlon), the neighborhood retrieval unit 340 may determine the position information 500 (Rlat, Rlon) where an evaluation value V by Math. 2 becomes minimum as the nearest position information.

$$V=(Rlat-Nlat)^2+(Rlon-Nlon)^2 \quad \text{[Math. 2]}$$

As another example, when the distance (kilometrage) from the starting point of the rail is used as the position information 500, the neighborhood retrieval unit 340 may determine the position information 500 where a difference between a current kilometrage and a kilometrage of the position information 500 becomes minimum as the nearest position information.

The neighborhood retrieval unit 340 outputs the reference alignment point cloud 510 of the reference three-dimensional point cloud information 540 to the alignment unit 330, and outputs the reference difference-extraction point cloud 520 of the reference three-dimensional point cloud information 540 to the difference extraction unit 350.

The alignment unit 330 receives the alignment point cloud 410 as the input information from the alignment area separation unit 320, and receives the reference alignment point cloud 510 as the input information from the neighborhood retrieval unit 340. The alignment unit 330 performs the alignment of the alignment point cloud 410 with respect to the reference alignment point cloud 510. The alignment unit 330 may employ typically known Iterative Closest Point (ICP) method and Normal Distributions Transformation (NDT) method as the method of the point cloud alignment. The alignment unit 330 rotates and translates the alignment point cloud 410 to obtain a rotational and translational movement parameter (amount of rotational and translational movement) where an error evaluation value with the reference alignment point cloud 510 becomes minimum. Hereinafter, the rotational and translational movement parameter is referred to as "posture information 430."

The alignment unit 330 outputs the obtained rotational and translational movement parameter to the difference extraction unit 350 as the posture information (alignment information) 430. A rotational and translational movement parameter A, a coordinate vector R of the reference alignment point cloud 510, and a coordinate vector P of the corresponding alignment point cloud 410 have a relationship indicated by Math. 3.

$$R \approx AP \quad \text{[Math. 3]}$$

The difference extraction unit 350 receives the difference-extraction point cloud 420 as the input information from the alignment area separation unit 320, receives the reference difference-extraction point cloud 520 as the input information from the neighborhood retrieval unit 340, and receives the posture information 430 as the input information from the alignment unit 330.

The difference extraction unit 350 deforms the difference-extraction point cloud 420 based on the posture information 430. In detail, the difference extraction unit 350 rotates and translates the difference-extraction point cloud 420 based on the posture information 430 to calculate a deformed three-dimensional point cloud. The difference extraction unit 350 calculates a distance of a nearest point of the reference difference-extraction point cloud 520 for each point of the deformed three-dimensional point cloud (coordinate of each deformed point). The difference extraction unit 350 outputs a point having a distance equal to or more than a threshold value TL to the communication device 150 as the changed area information 220.

Math. 4 indicates a determination of whether the points of the difference-extraction point cloud 420 are each included in the changed area information 220 or not assuming that the posture information 430 is A, the coordinate of each point of the difference-extraction point cloud 420 is P, the coordinate of the point nearest to P of the reference difference-extraction point cloud 520 is R, and the threshold value is TL.

$$\text{length}(R-AP)>TL \text{ difference}$$

$$\text{length}(R-AP) \leq TL \text{ not difference} \qquad [\text{Math. 4}]$$

The difference extraction unit 350 deforms the coordinates P of the respective points of the difference-extraction point cloud 420 in accordance with the posture information A, and outputs the point of the difference-extraction point cloud 420 as the changed area information 220 when this point has the distance from the coordinate R of the point nearest to P of the reference difference-extraction point cloud 520 is larger than the threshold value TL. Otherwise, the difference extraction unit 350 does not include that point of the difference-extraction point cloud 420 in the changed area information 220. The difference extraction process described here is merely one example, and the difference extraction process is not limited to this.

With this embodiment, the photographing device (for example, the three-dimensional sensor) 110 mounted to the vehicle 100 obtains the three-dimensional point cloud data around the vehicle. The alignment area separation unit 320 separates the point cloud in the space including few moving objects in the three-dimensional point cloud 400 as the alignment point cloud 410. This ensures the alignment process in the space including few moving objects. The alignment unit 330 can stably perform the alignment between the past three-dimensional point cloud (reference alignment point cloud 510) and the current three-dimensional point cloud (alignment point cloud 410). Consequently, the difference extraction unit 350 obtains the difference between the past normal three-dimensional point cloud (reference difference-extraction point cloud 520) and the current three-dimensional point cloud (difference-extraction point cloud 420), thus detecting the abnormal part such as the foreign object outside the operating vehicle area, and the damage of the railroad-related facility.

Conventionally, there is a problem that a deviation occurs in the alignment between a barycentric position of the past normal three-dimensional point cloud and a barycentric position of the current three-dimensional point cloud, resulting in a detection of the normal part originally without the difference as the abnormal part. In contrast, with this embodiment, the alignment area 550 where the area including the moving object is eliminated as much as possible is configured and the point cloud for the alignment is extracted from this alignment area 550. Therefore, this embodiment can prevent the normal part from being detected as the abnormal part caused by a deviation in the alignment due to the presence/absence of the moving object. Accordingly, the foreign object and the damage of the railroad-related facility outside the operating vehicle area can be stably detected.

The above-described embodiment is merely one example and various changes are allowed to be made. For example, the difference extraction unit 350 may store the changed area information 220 as the abnormality information in the storage 140. When the vehicle 100 includes a display device, the difference extraction unit 350 may output the changed area information 220 to the display device to notify an operator and the like of the vehicle 100 of the foreign object and the damage of the facility via the display device.

Figure 9:
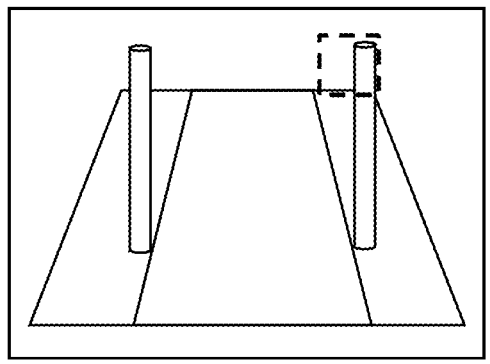
FIG. 9 is a drawing describing a modification of the first embodiment.
Figure 9:
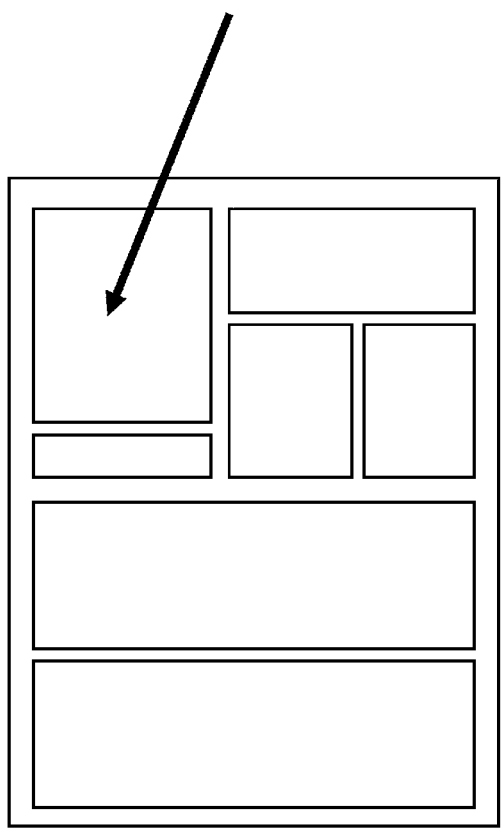

For example, the photographing device 110 may further include a camera sensor that outputs a camera image (two-dimensional image), and the ground station 160 may receive the two-dimensional image with the changed area information 220. The processing device of the ground station 160 may obtain a correspondence relationship between the points of the changed area (the three-dimensional point cloud as the difference) extracted by the difference extraction unit 350 and the respective pixels of the two-dimensional image and superimpose the information (for example, marking with a frame and the like) indicative of the abnormal part on the two-dimensional image using this correspondence relationship. Then, the processing device of the ground station 160 may display this two-dimensional image via the display device. FIG. 9 includes an upper drawing illustrating one example where the information indicative of the abnormal part is displayed on the two-dimensional image. The display processing of the abnormal part is not limited to such a marking, but may be performed with another method ensuring the abnormal part to be detected. This configuration ensures presentation of the abnormal part with the two-dimensional image easily seen by the user based on the obtained three-dimensional information on the abnormal part.

The document generation device of the ground station 160 may automatically generate the business document such as the facility inspection report or the repair work instruction by laying out the above-described two-dimensional image and the information on the date/time and a place where the abnormal part is found and similar matter in accordance with a predetermined format. FIG. 9 includes a lower drawing illustrating one example where the two-dimensional image on which the abnormal part is indicated is arranged in the predetermined format to generate the business document. Various kinds of information such as a time (date) and a position where the failure is detected and a creator of the business document may be input in an area other than the two-dimensional image. The processing device and the document generation device on the ground station 160 side may be mounted to the vehicle 100.

Second Embodiment

Figures 10, 11:
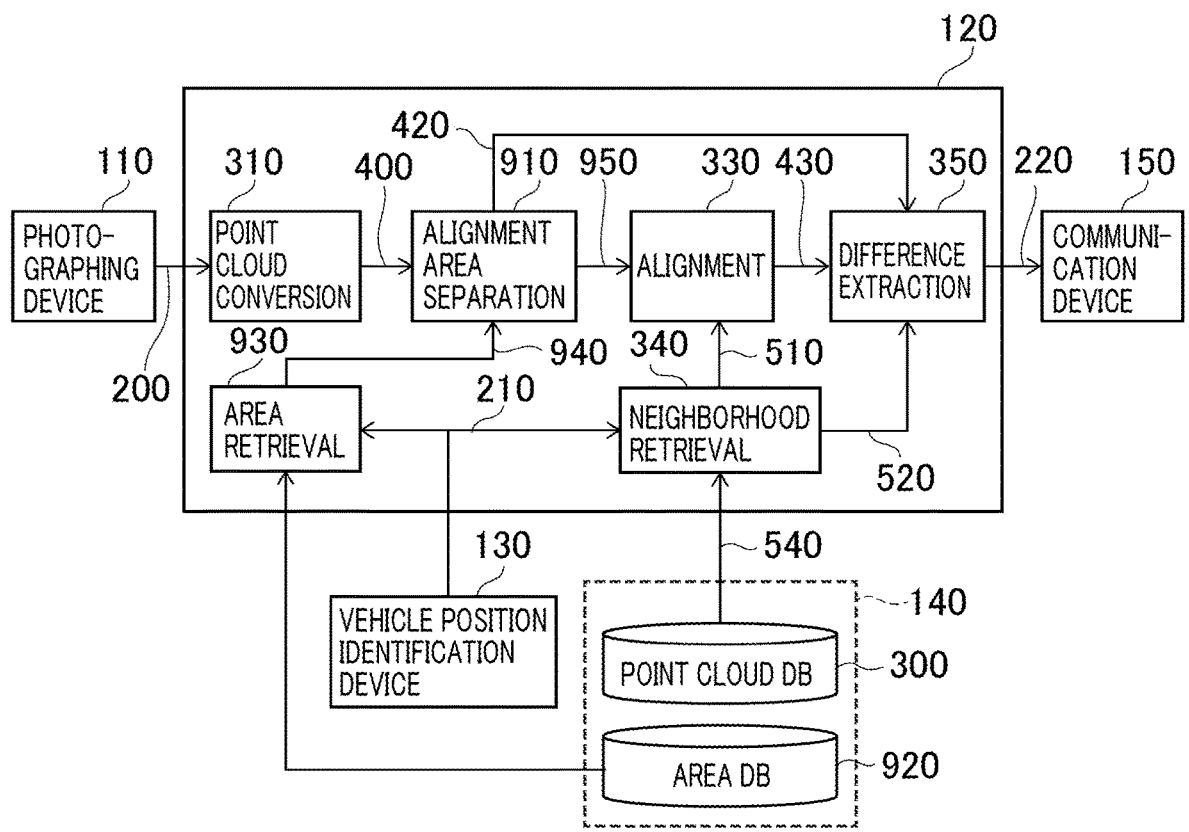
FIG. 10 is a drawing describing a configuration of an image processing device according to a second embodiment.
FIG. 11 is a drawing describing an area DB.

FIG. 10 is a drawing describing a configuration of an image processing device 120 according to the second embodiment. Identical reference numerals are assigned for the components described in the above-described first embodiment and the descriptions are omitted.

The image processing device 120 includes the point cloud conversion unit 310, an alignment area separation unit 910, the alignment unit 330, the neighborhood retrieval unit 340, the difference extraction unit 350, and an area retrieval unit 930. An area DB 920 is a database implemented to the storage 140.

FIG. 11 illustrates an exemplary area DB 920. The area DB 920 includes reference position information 1010 and alignment area candidate information 1020 as configuration items. The area DB 920 includes the information on the point clouds as candidates of the alignment area on respective reference positions (reference position information 1010) on the rail. The alignment area separation unit 320 of the first embodiment separates the point cloud included in the predetermined space (alignment area 550) as the alignment point cloud 410. Meanwhile, the alignment area separation unit 910 of the second embodiment can change the space for extracting an alignment point cloud 950 corresponding to the alignment area candidate information 1020 of the area DB 920. The area DB 920 holds the information on the appropriate alignment area candidate for each position on the track (railroad rail). As one example, the area DB 920 may hold an area (the utility pole and the beam) of FIG. 6 as the information on the alignment area candidate at one traveling position while holding an area (the slope) of FIG. 7 as the information on the alignment area candidate at the other traveling position. Accordingly, the accuracy of the alignment process by the alignment unit 330 improves, and consequently, the accuracy of the extraction of the changed area information by the difference extraction unit 350 also improves.

The area DB 920 holds the reference position information 1010 and the alignment area candidate information 1020 mutually matched. The reference position information 1010 holds the information on the latitude and the longitude indicative of the reference position and the orientation indicative of the reference direction. As the reference position information 1010, the distance (kilometrage) from the starting point of the rail and the information on the line (for example, up, down, main line, and subsidiary main line) may be used. The alignment area candidate information 1020 holds a plurality of areas including few moving objects in the surrounding environment of the railroad rail as candidate areas of the alignment. The alignment area candidate information 1020 holds a set of XYZ coordinates of four apexes of a tetrahedron as relative coordinates having the reference position and the reference direction as the origin. While the alignment area candidate information 1020 holds the information on the four apexes of the tetrahedron in this example, the configuration is not limited to this and the information on any other space may be held.

The area retrieval unit 930 receives the vehicle position information 210 as the input information from the vehicle position identification device 130. The area retrieval unit 930 uses the vehicle position information 210 to retrieve information from the area DB 920, and reads the alignment area candidate information 1020 associated with the reference position information 1010 nearest to the vehicle position information 210.

The area retrieval unit 930 may directly output the alignment area candidate information 1020 as an alignment area 940 to the alignment area separation unit 910, while the alignment area candidate information 1020 may be narrowed using a predetermined condition. The condition used here may include, for example, information on a measuring range of a three-dimensional sensor.

Figure 12:
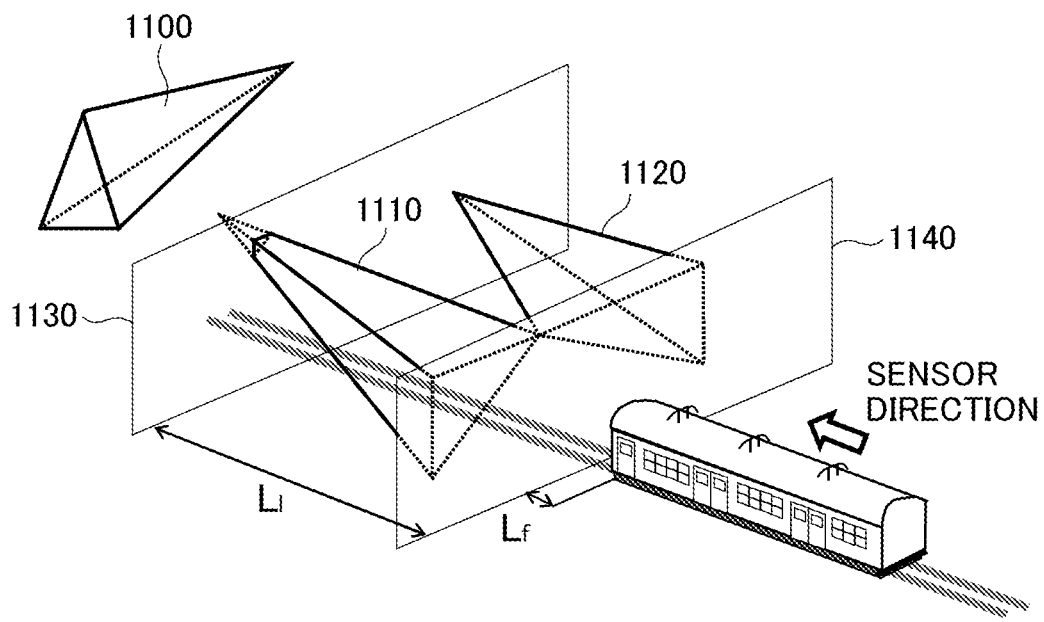
FIG. 12 illustrates an exemplary narrowing process of alignment area candidate information.

FIG. 12 illustrates an exemplary narrowing process of the alignment area candidate information. Assume that the area retrieval unit 930 obtains the information on three alignment area candidates 1100, 1110, and 1120 as the alignment area candidate information 1020 from the area DB 920. The area retrieval unit 930 reads the condition for the narrowing stored in the storage 140. The condition used here is the information on the measuring range of the three-dimensional sensor, and includes information on a sensor proximity limit Lf and a sensor limit Ll ahead of the vehicle.

The area retrieval unit 930 sets a first sensor limit plane 1130 and a second sensor limit plane 1140 based on the information on the sensor proximity limit Lf and the sensor limit Ll. The area retrieval unit 930 extracts an area defined by the alignment area candidates 1100, 1110, and 1120 and included in a space between the first sensor limit plane 1130 and the second sensor limit plane 1140 as the alignment area 940. The area retrieval unit 930 outputs the extracted alignment area 940 to the alignment area separation unit 910. With this configuration, the area retrieval unit 930 narrows the alignment area candidate according to the condition and outputs it to the alignment area separation unit 910, thus reducing the amount of calculation in the process performed thereafter. Consequently, the speed of the separation process of the point cloud by the alignment area separation unit 910 and the speed of the alignment process by the alignment unit 330 can be improved.

The alignment area candidate (tetrahedron) 1100 is present forward with respect to the first sensor limit plane 1130 in the traveling direction of the vehicle 100, thus not being included in the alignment area 940. Meanwhile, the alignment area candidate (tetrahedron) 1110 has a part of the tetrahedron present forward with respect to the first sensor limit plane 1130. Then this part is not included in the alignment area 940 and the other part is included in the alignment area 940. The alignment area candidate (tetrahedron) 1120 is present in the space between the first sensor limit plane 1130 and the second sensor limit plane 1140. Then, the whole alignment area candidate 1120 is included in the alignment area 940.

The alignment area separation unit 910 receives the three-dimensional point cloud 400 as the input information from the point cloud conversion unit 310, and receives the alignment area 940 corresponding to the current position of the vehicle 100 as the input information. The alignment area separation unit 910 outputs the point cloud included in the alignment area 940 in the three-dimensional point cloud 400 as the alignment point cloud 950 to the alignment unit 330, and outputs every point cloud in the three-dimensional point cloud 400 as the difference-extraction point cloud 420 to the difference extraction unit 350.

Figure 13:
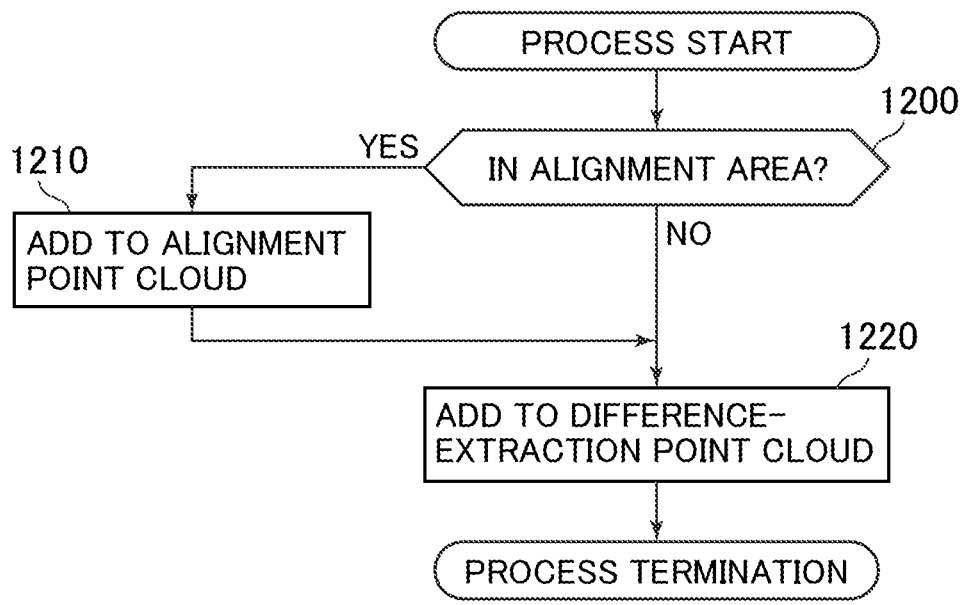
FIG. 13 illustrates an exemplary flowchart describing a process by an alignment area separation unit according to the second embodiment.

FIG. 13 illustrates an exemplary flowchart describing the process by the alignment area separation unit 910. The alignment area separation unit 910 performs an alignment area determination first with the points of the three-dimensional point cloud 400 input from the point cloud conversion unit 310 as a target point cloud (Step 1200). The alignment area separation unit 910 determines whether the coordinate of the target point cloud is present within the alignment area 940 output from the area retrieval unit 930 or not.

When the target point is determined to be present within the alignment area 940 at Step 1200, the alignment area separation unit 910 adds this point to the alignment point cloud 950 (Step 1210), and then, the process proceeds to Step 1220.

Meanwhile, when the target point is determined not to be present within the alignment area 940 at Step 1200, the process proceeds to Step 1220.

The alignment area separation unit 910 adds the target point to the difference-extraction point cloud 420 (Step 1220). After the flowchart of FIG. 13 terminates on every point of the three-dimensional point cloud 400, the alignment area separation unit 910 outputs the alignment point cloud 950 to the alignment unit 330, and outputs the difference-extraction point cloud 420 to the difference extraction unit 350.

The reference alignment point cloud 510 of the point cloud DB 300 of this embodiment holds the past point cloud corresponding to the alignment area 940. The alignment unit 330 performs the alignment of the alignment point cloud 950 with respect to the reference alignment point cloud 510. The process of the neighborhood retrieval unit 340, the process of the difference extraction unit 350, and similar process are similar to those of the first embodiment.

With this embodiment, the area retrieval unit 930 retrieves the known peripheral alignment area candidate information 1020 from the area DB 920 based on the vehicle position information 210 in the vehicle position identification device 130. The alignment area separation unit 910 can extract the alignment point cloud 950 from the three-dimensional point cloud 400 based on the alignment area candidate information 1020. With this embodiment, the alignment area can be flexibly specified for each vehicle position compared with the first embodiment. For example, in the example of FIG. 5, the space for extracting the alignment point cloud is the limited space forward and upward of the vehicle 100 at any position on the rail. However, in this embodiment, the area obviously without the moving object, for example, the construction such as a building adjacent to the railroad rail, also can be used as the alignment area for each traveling position. Especially, since the surrounding environment of the railroad rail changes by the positions of the vehicle 100, the alignment area appropriate for each position can be specified, thus ensuring the stable alignment process and difference extraction process of the three-dimensional point cloud.

The above-described embodiment is merely one example and various changes are allowed to be made. For example, the facility inspection system may include an interface and a processing unit (DB modification unit) for modifying the area DB 920. For example, when the user confirms the changed area information 220 output from the difference extraction unit 350 on the display device and the changed area information 220 includes many errors, it is considered a case where the alignment area is not appropriately specified. The user may input the modified information via the predetermined interface on the display device to cause the DB modification unit to modify the alignment area candidate information 1020 in the area DB 920 based on the input modified information.

Third Embodiment

Figure 14:
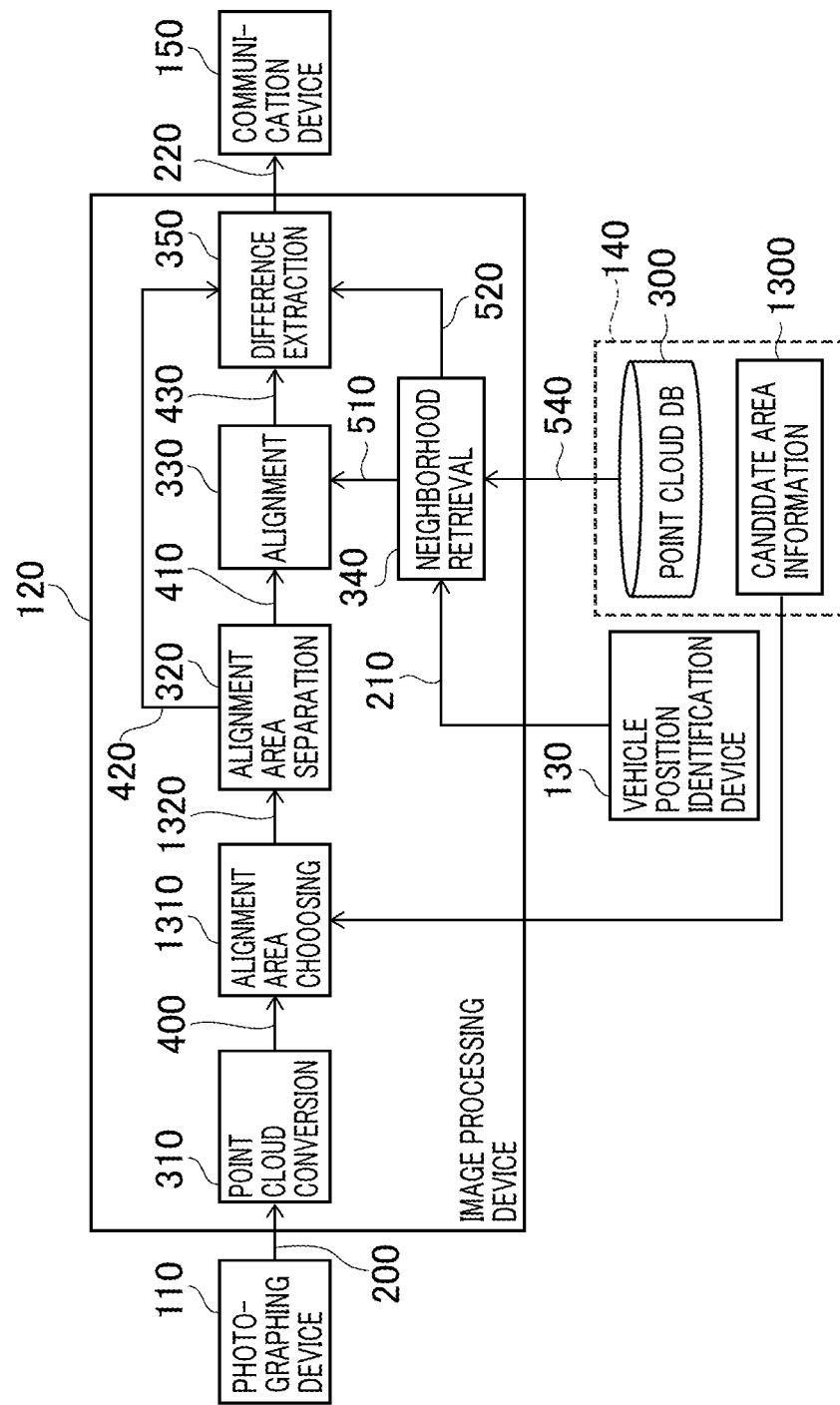
FIG. 14 is a drawing describing a configuration of an image processing device according to a third embodiment.

FIG. 14 is a drawing describing a configuration of an image processing device 120 according to the third embodiment. Identical reference numerals are assigned for the components described in the above-described first embodiment and the descriptions are omitted.

The image processing device 120 further includes an alignment area choosing unit 1310 in addition to the configuration of FIG. 2. The alignment area choosing unit 1310 receives the three-dimensional point cloud 400 as the input information from the point cloud conversion unit 310, and obtains candidate area information 1300 stored in the storage 140 as the input information. The candidate area information 1300 includes the information on a plurality of candidate areas and information on priority orders of the respective candidate areas. The alignment area choosing unit 1310 determines a count of three-dimensional points in each candidate area of the three-dimensional point cloud 400 detected via the photographing device 110 in accordance with the priority order, and chooses the area having a predetermined count or more of three-dimensional points as the alignment area.

Figure 15:
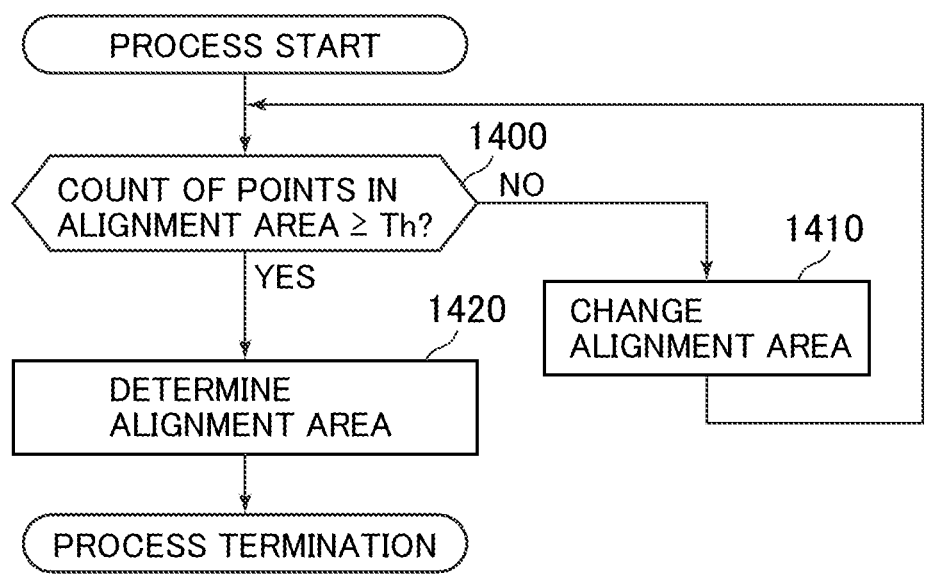
FIG. 15 illustrates an exemplary flowchart describing a process by an alignment area choosing unit according to the third embodiment.
Figure 16:
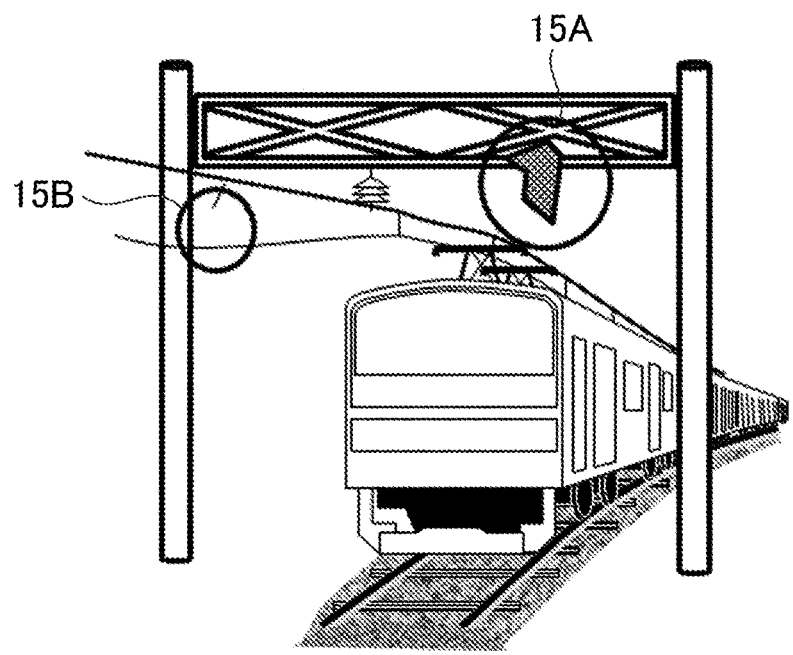
FIG. 16 is a drawing describing adherence of a foreign object to the railroad facility and a damage of the railroad facility.
Figure 17:
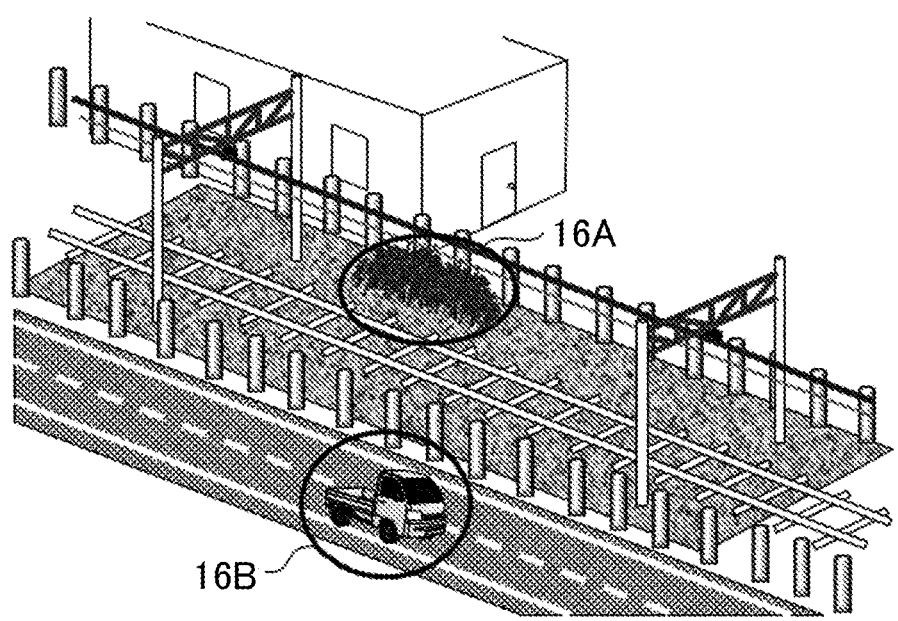
FIG. 17 illustrates a concrete example of a moving object around the rail.

FIG. 15 illustrates an exemplary flowchart describing a process by the alignment area choosing unit 1310. Here, as one example, the candidate area information 1300 includes information on a first area as a first priority order and information on a second area as a second priority order. For example, the first area is an area including the utility pole 610 and the beam 620 illustrated in FIG. 6, and the second area is an area on the side surface side of the vehicle 100 illustrated in FIG. 7. The candidate area information 1300 may hold the information on the three or more areas.

The alignment area choosing unit 1310 obtains the candidate area information 1300. Then, the candidate area choosing unit 1310 first determines whether the count of three-dimensional points in the first area of the three-dimensional point cloud 400 detected via the photographing device 110 is equal to or more than a threshold Th or not (Step 1400).

When the count of three-dimensional points in the first area is equal to or more than the threshold Th at Step 1400, the process proceeds to Step 1420. The alignment area choosing unit 1310 determines the first area as the alignment area (Step 1420). Then, the alignment area choosing unit 1310 outputs alignment area information 1320 to the alignment area separation unit 320.

When the count of three-dimensional points in the first area is less than the threshold Th at Step 1400, the process proceeds to Step 1410. The alignment area choosing unit 1310 changes the alignment area to the second area as the second priority order (Step 1410). Then, the process returns to Step 1400, and when the condition of Step 1400 is satisfied, the alignment area choosing unit 1310 determines the second area as the alignment area (Step 1420). When three or more candidate areas are configured, it is only necessary to repeatedly execute Steps 1400 and 1410 by the count to determine the alignment area.

With this embodiment, the alignment area choosing unit 1310 can choose the alignment area corresponding to the count of three-dimensional points in the alignment area candidate detected via the photographing device 110 at that time. For example, the utility pole 610 and the beam 620 illustrated in FIG. 6 are disposed along the rail at intervals of about 30 to 65 m. Accordingly, a situation where the utility pole 610 and the beam 620 are not included in the measuring range of the photographing device 110 occurs during the travel of the vehicle 100. In this case, the absence of the point cloud in the first area (area forward and upward of the vehicle 100) fails in performing the alignment well. In this embodiment, even in such a case, the alignment area choosing unit 1310 chooses the second area (area on the side surface side of the vehicle 100) as the alignment area, and determines the second area as the alignment area when the count of three-dimensional points in the second area is equal to or more than the predetermined count. Thus, with this embodiment, the area where the three-dimensional point cloud is detected can be chosen as the alignment area.

According to this embodiment, the plurality of candidate areas have the priority orders. The alignment area choosing unit 1310 can determine the area where the priority order is high and the count of three-dimensional points is equal to or more than the predetermined count as the alignment area.

In this embodiment, it is only necessary that the reference alignment point cloud 510 of the point cloud DB 300 holds the information corresponding to the area included in the candidate area information 1300. Other processes are similar to those of the first embodiment.

This embodiment is also applicable to the second embodiment. The alignment area choosing unit 1310 may receive the plurality of alignment areas as the input information from the area retrieval unit 930 and determine the area having the predetermined count or more of three-dimensional points among the plurality of alignment areas as the alignment area. The alignment area choosing unit 1310 only needs to output the information on the determined alignment area to the alignment area separation unit 910.

This disclosure is not limited to the above-described embodiments but includes various modifications. The above-described embodiments have been described in detail for easy understanding of this disclosure, and therefore, it is not necessarily limited to include all described configurations. It is possible to replace a part of the configuration of one embodiment with a configuration of another embodiment. It is possible to add a configuration of one embodiment to a configuration of another embodiment. Some of the configurations of each embodiment can be added to, removed from, or replaced by another configuration.

While the neighborhood retrieval unit 340 obtains the reference three-dimensional point cloud information 540 from the point cloud DB 300 based on the current position information in the above-described embodiment, the configuration is not limited to this. For example, a method where numbers are assigned to the reference three-dimensional point cloud information 540 for each position and the reference three-dimensional point cloud information 540 is obtained in association with the number, or a method where tags are disposed on the rail and the reference three-dimensional point cloud information 540 of the identical tag is obtained may be employed.

The respective configurations, functions, and the like of the above-described image processing device 120 may be achieved by the processor configured to interpret and execute the program to achieve each function with software. The information on the programs, files, and the like to achieve respective functions can be stored in a storage device such as a memory, a hard disk, and a Solid State Drive (SSD) or a recording medium such as an IC card, an SD card, and a DVD. A part of or all the configurations and the like of the above-described image processing device 120 may be achieved by hardware designed as, for example, an integrated circuit.

In the above-described embodiments, control lines and information lines considered necessary for the explanation are described. All of the control lines and the information lines of the product are not necessarily described. All configurations may be mutually coupled.

LIST OF REFERENCE NUMERALS 100 vehicle
110 photographing device
120 image processing device
130 vehicle position identification device
140 storage (storage device)
150 communication device
160 ground station
200 range image
210 vehicle position information
220 changed area information
230 reference three-dimensional point cloud information
240 changed area detection signal
300 point cloud DB
310 point cloud conversion unit
320 alignment area separation unit
330 alignment unit
340 neighborhood retrieval unit
350 difference extraction unit
400 three-dimensional point cloud
410 alignment point cloud
420 difference-extraction point cloud
430 posture information (alignment information)
500 position information
510 reference alignment point cloud
520 reference difference-extraction point cloud
540 reference three-dimensional point cloud information
910 alignment area separation unit
920 area DB
930 area retrieval unit
940 alignment area
950 alignment point cloud
1010 reference position information
1020 alignment area candidate information
1310 alignment area choosing unit

The invention claimed is:

1. A facility inspection system comprising:
   a photographing device that photographs an image of a surrounding environment of a vehicle moving on a track;
   a storage device that stores a reference alignment point cloud and a reference difference-extraction point cloud for each position on the track;
   an alignment area separation unit that separates an alignment point cloud from a three-dimensional point cloud obtained from the image;
   an alignment unit that performs an alignment of the reference alignment point cloud and the alignment point cloud, the alignment unit outputting alignment information;
   a difference extraction unit that extracts a difference between the three-dimensional point cloud deformed based on the alignment information and the reference difference-extraction point cloud; and
   an alignment area choosing unit that determines an area among a plurality of candidate areas as an alignment area, the area including a predetermined count or more of three-dimensional points detected via the photographing device, determining the area by
      determining whether a count of three-dimensional points in a first area of the plurality of candidate areas is equal to or greater than a threshold,
      selecting the first area as the alignment area when the count of three-dimensional points on the first area is equal to or greater than the threshold, and
      selecting a different area of the plurality of candidate areas to be the alignment area when the count of three-dimensional points on the first area is less than the threshold,
   wherein the alignment point cloud is present in the alignment area, and
   wherein the plurality of candidate areas each have a different priority order.

2. The facility inspection system according to claim 1,
wherein the alignment area separation unit outputs a point cloud in the three-dimensional point cloud as the alignment point cloud, and the point cloud is present in a predetermined space including few moving objects.

3. The facility inspection system according to claim 2,
wherein the predetermined space is a space obliquely upward, upward, or on a side surface side of the vehicle.

4. The facility inspection system according to claim 3,
wherein the predetermined space is configured so as to include:
   a part of a utility pole disposed along the track and a beam between the utility poles; or
   a part of a slope on the side surface side of the vehicle.

5. The facility inspection system according to claim 1,
wherein the storage device stores alignment area candidate information for each position on the track, and
the alignment area separation unit outputs a point cloud in the three-dimensional point cloud as the alignment point cloud, the point cloud being included in the alignment area candidate information.

6. The facility inspection system according to claim 5, further comprising
an area retrieval unit that retrieves the alignment area candidate information from the storage device based on a current position of the vehicle.

7. The facility inspection system according to claim 6,
wherein the area retrieval unit narrows the alignment area candidate information based on a measuring range of the photographing device.

8. The facility inspection system according to claim 1, further comprising
a neighborhood retrieval unit that retrieves the reference alignment point cloud and the reference difference-extraction point cloud from the storage device based on a current position of the vehicle.

9. The facility inspection system according to claim 1,
wherein the alignment area choosing unit chooses the plurality of candidate areas in accordance with priority orders, such that an area of the plurality of candidate areas with a higher priority order than an other area of the plurality of candidate areas is chosen first.

10. A facility inspection method comprising:
a step of photographing an image of a surrounding environment of a vehicle moving on a track by a photographing device;
a step of separating an alignment point cloud from a three-dimensional point cloud obtained from the image by an alignment area separation unit;
a step of performing an alignment of a reference alignment point cloud stored in a storage device and the alignment point cloud and outputting alignment information by an alignment unit;
a step of extracting a difference between the three-dimensional point cloud deformed based on the alignment information and a reference difference-extraction point cloud stored in the storage device by a difference extraction unit; and
a step of determining an area among a plurality of candidate areas as an alignment area, via an alignment area choosing unit, the area including a predetermined count or more of three-dimensional points detected via the photographing device, the step of determining including
   determining whether a count of three-dimensional points in a first area of the plurality of candidate areas is equal to or greater than a threshold,
   selecting the first area as the alignment area when the count of three-dimensional points on the first area is equal to or greater than the threshold, and
   selecting a different area of the plurality of candidate areas to be the alignment area when the count of three-dimensional points on the first area is less than the threshold,
wherein the alignment point cloud is present in the alignment area, and
wherein the plurality of candidate areas each have a different priority order.

* * * * *